Sept. 22, 1964     E. P. RIPLEY     3,149,392
BLOCK MOLDING MACHINE WITH INVERTING MOLD BOX
Filed June 22, 1961     4 Sheets-Sheet 1
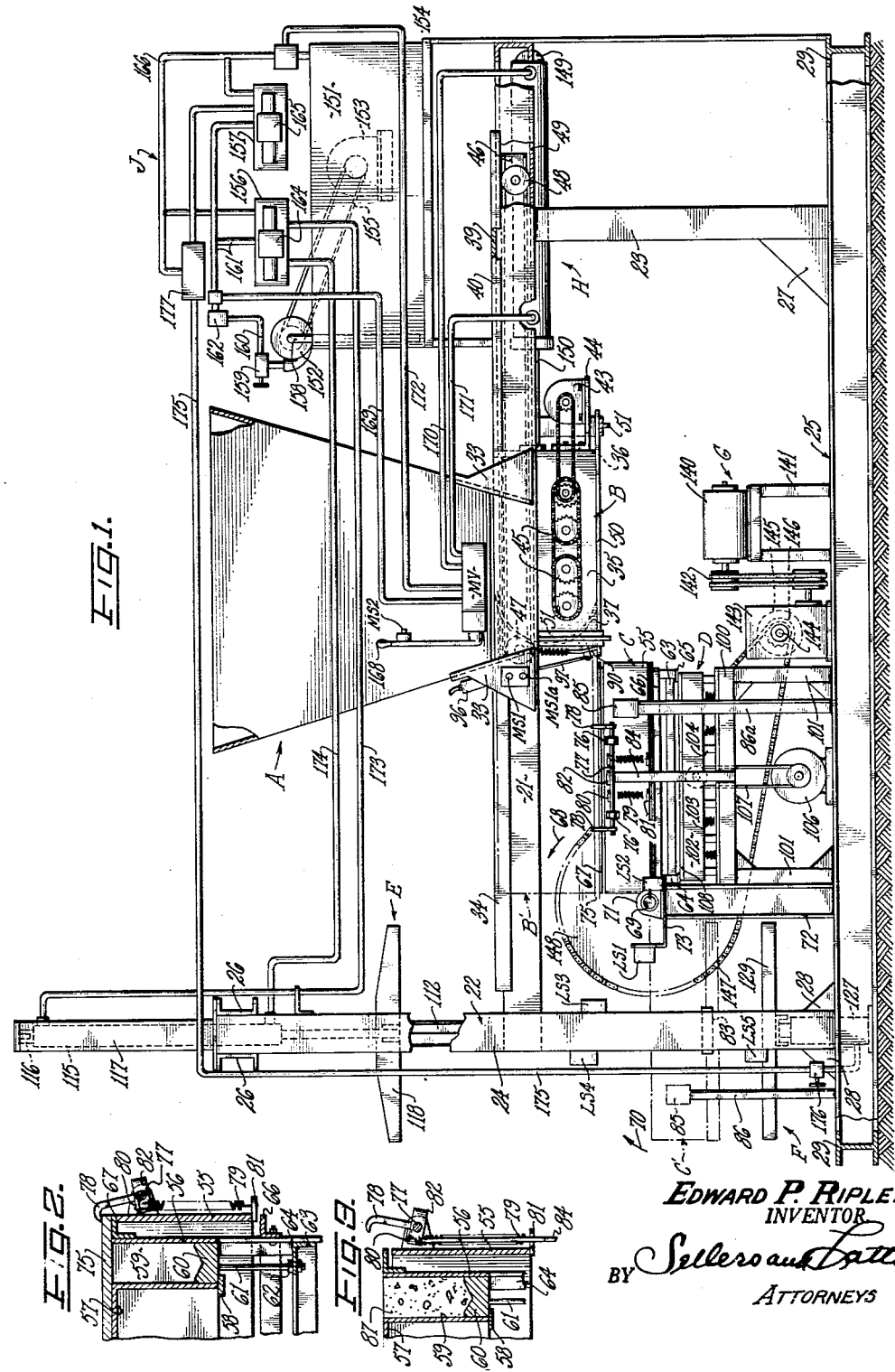
EDWARD P. RIPLEY
INVENTOR
BY Sellers and Latta
ATTORNEYS

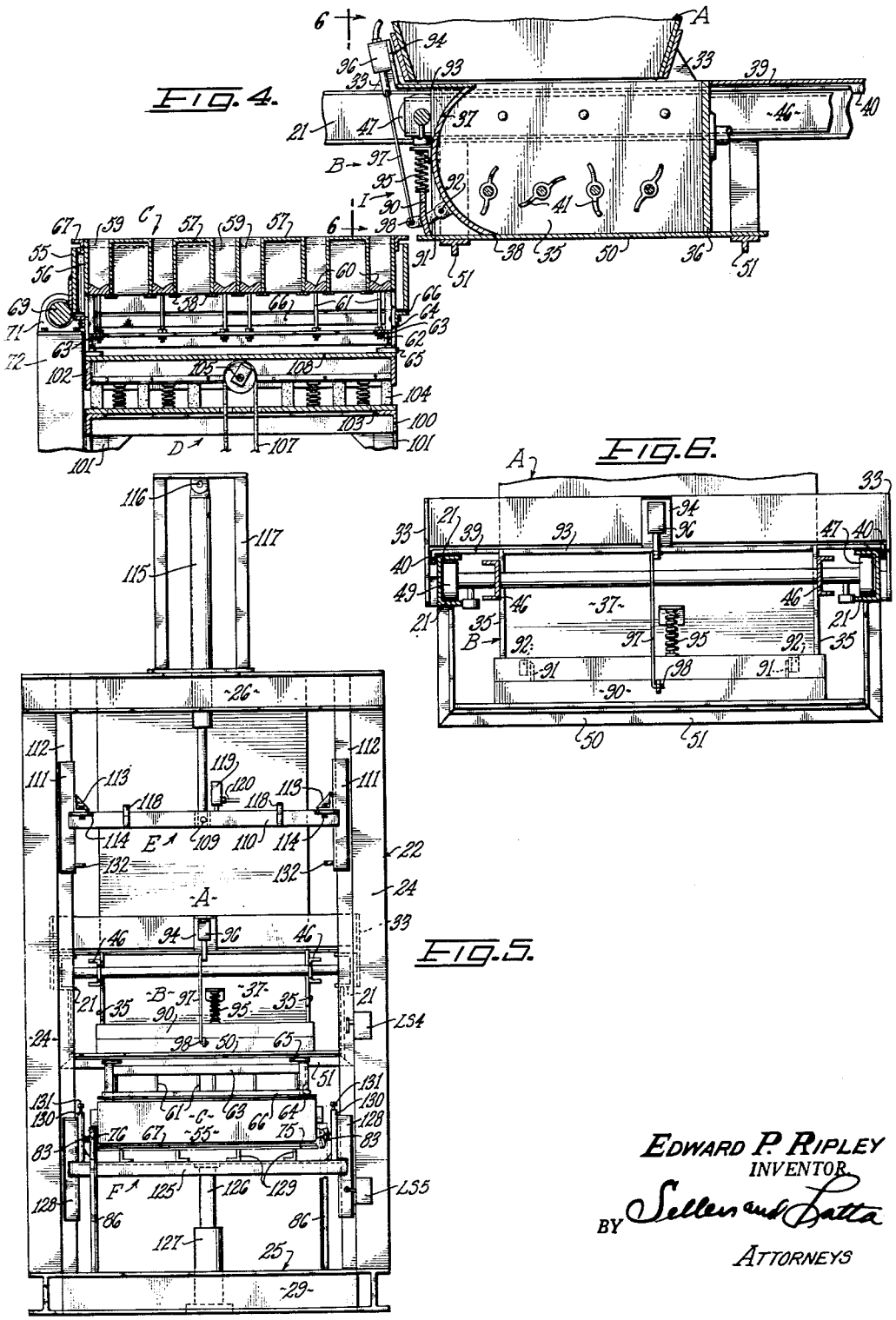

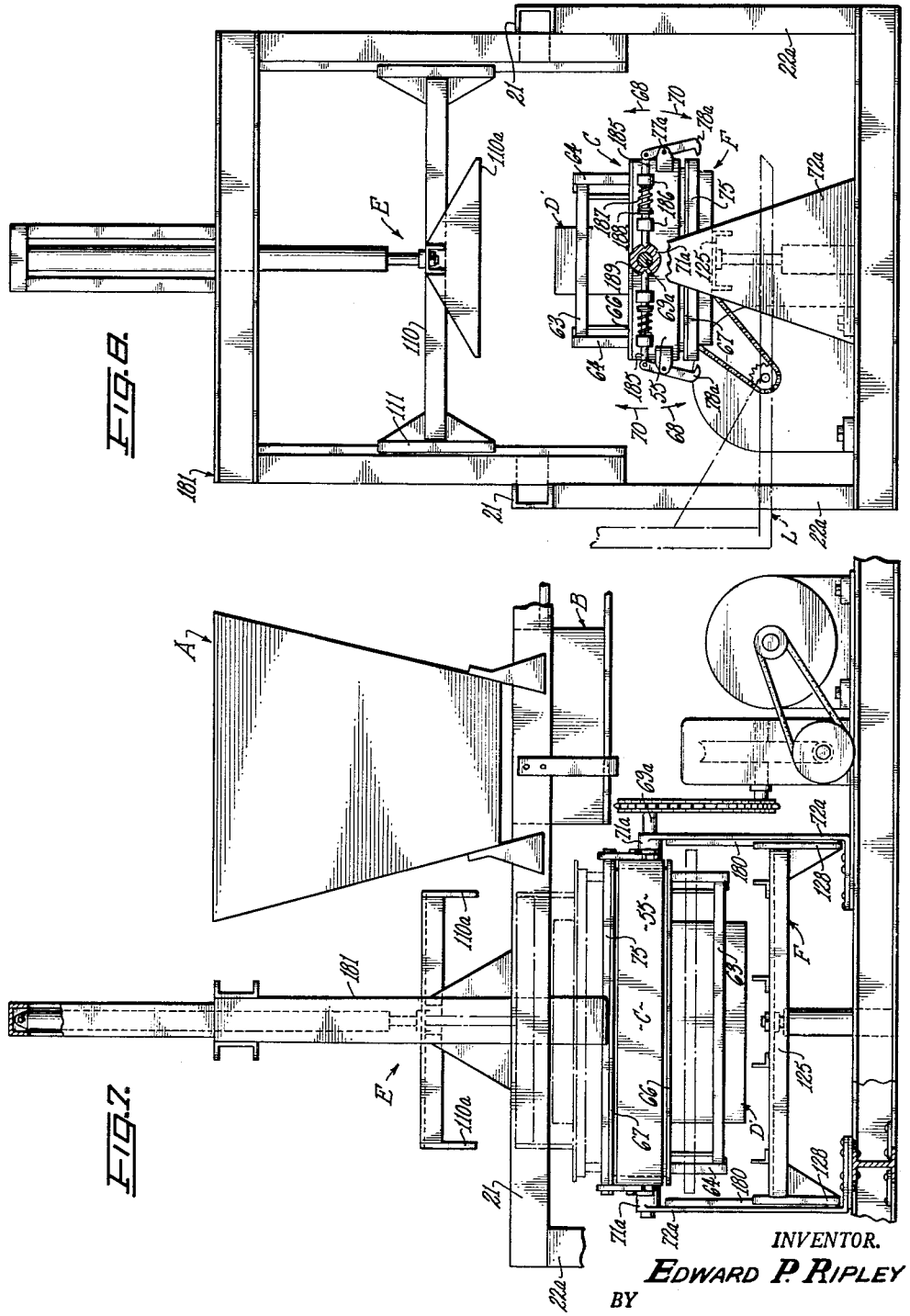

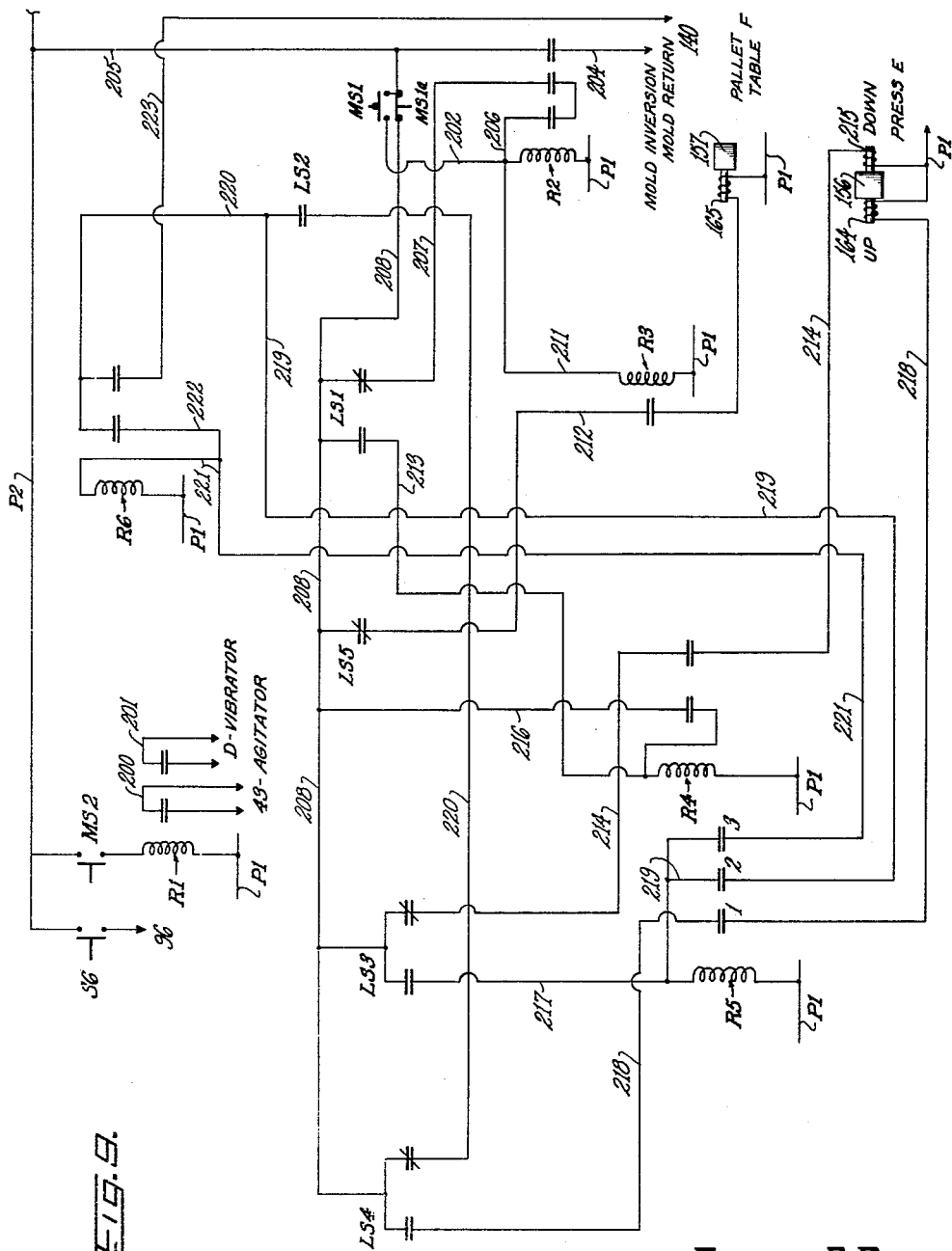

United States Patent Office 3,149,392
Patented Sept. 22, 1964

3,149,392
BLOCK MOLDING MACHINE WITH
INVERTING MOLD BOX
Edward P. Ripley, 6308 Orion, Van Nuys, Calif.
Filed June 22, 1961, Ser. No. 118,975
10 Claims. (Cl. 25—41)

This invention relates in general to the manufacture of concrete blocks and in particular to sculptured blocks of the type commonly known as "screen wall blocks." The general object of the invention is to provide a semi-automatic machine having means for feeding wet concrete "mud" from a hopper to a mold in which the blocks are molded, and for removing the green blocks from the mold in undamaged form and depositing them upon a pallet on which they will be supported for handling and storage for curing up to the point where they can be handled individually without damage.

More specifically, the invention contemplates a semi-automatic block molding machine wherein green sculptured blocks are shaped in a mold to which is then attached a pallet covering the upper faces of the blocks; in which the mold is then inverted so as to bring the attached pallet to a position at the bottom of the mold; in which the green blocks are then ejected from the mold by a press having a push-out action; and in which a pallet is supported for downward movement during the ejection of the blocks, in synchronism with the push-out action of the press, so as to remain in a supporting position with respect to the blocks as they are ejected from the mold.

A further object is to provide such a machine having a vertically movable pallet-supporting table which, as the mold is being inverted, is elevated to a position to establish supporting contact with the lower face of the pallet when the mold reaches the completely inverted position; and wherein such pallet table is moved downwardly by pressure transmitted thereto through pressure-transmitting means acting between the press and the table during the ejection operation, whereby exact synchronism of the movements of press and supporting table are attained so as to insure constant full supporting contact between the pallet and the lower faces of the blocks throughout the ejection operation, and at the same time fully avoiding any application of crushing pressure to the green blocks.

More particularly, the invention, in its preferred form, contemplates an apparatus wherein the charge of mud from the hopper is intermittently delivered into a feed drawer which then transfers the charge to a position above the mold in the receiving position of the latter, wherein the mud is delivered by gravity into the mold while being subjected to vibration to assist the transfer flow of the mud into the mold and to compact the green blocks as they are formed in the mold. The invention further contemplates the use of agitation in addition to vibration to further assist the rapid filling of the mold by flow from the feed drawer.

A still further object of the invention is to provide for automatic limiting of the inverting movement of the mold; of the downward stroke of the ejection press; of the return of the mold to its charge-receiving position.

A still further object is to provide means for automatically clamping the pallet to the top of the mold at the beginning of the inverting operation and for automatically releasing the attachment of the pallet to the mold at the end of the inverting movement, so that the pallet may separate from the mold and move downwardly in the ejection operation.

Other objects and advantages will become apparent in the ensuing specifications and appended drawing, in which:

FIG. 1 is a front side elevational view of a block molding machine embodying the invention;

FIGS. 2 and 3 are fragmentary sectional views illustrating the pallet latching mechanism;

FIG. 4 is a fragmentary longitudinal sectional view of the mold unit and feed drawer;

FIG. 5 is a front elevational view of the machine;

FIG. 6 is a front elevational view of the feed drawer, showing the frame of the machine in cross section;

FIGS. 7 and 8 are fragmentary side and front elevational views illustrating modified features of construction; and FIG. 9 is a circuit diagram of the electrical control apparatus of the machine.

General Description of Apparatus and Its Operation

Referring now to the drawings in detail and in particular to FIG. 1, I have shown therein, as an example of a preferred form of the invention a semi-automatic block molding apparatus comprising, in general, a hopper A; a feed drawer B having means for reciprocating the same in a horizontal path parallel to the longitudinal axis of the machine between a loading position shown in full lines at 3 in FIG. 1 and a discharge position shown in broken lines at B'; a mold unit C, hingedly mounted for swinging movement in a direction generally parallel to the longitudinal axis of the machine, between a receiving position shown in full lines at C and a discharge position shown in broken lines at C'; a vibrating unit D upon which the mold unit C receives vibration during the filling of the mold; a hydraulic press unit E, operative to strip the block (or blocks) from the inverted mold unit C'; and a pallet-supporting table F which is elevated by an actuator started simultaneously with the beginning of the inverting movement of the mold, which arrives at an elevated position to receive the pallet forming the bottom of the inverted mold just prior to or simultaneous with the completion of the inverting movement, and which has means for resiliently resisting the downward movement imparted thereto by the press unit E while yielding to such downward movement as the blocks are ejected from the mold, thereby maintaining full supporting contact of the green blocks in the mold by the pallet released from the bottom of the mold, as the blocks are ejected. The invention further includes a reversible electric motor and reduction gear unit, indicated generally at G, for driving the mold unit C in its inverting and return movements; together with limit switches LS1, LS2 for terminating the inverting movement and the return movement of the mold unit respectively; a limit switch LS3 for arresting and reversing the ejection movement of the press E; a trip switch LS4 to start return of the mold unit C to its charging position; a limit switch LS5 for arresting elevating movement of pallet table F; a manual switch MS1 for starting the inverting movement of the mold and the elevating movement of the pallet table F; and a manual (push button) switch MS2 for controlling the operation of vibrating unit D and of agitator mechanism which is incorporated in the feed drawer B. Feed drawer B carries a strike-off unit I for leveling the mud at the upper face of mold unit C during charging.

The apparatus further includes a hydraulic actuator H for transmitting reciprocating movement to the feed drawer B; a pair of hydraulic actuator units embodied in the ejector press E and the pallet table unit F respectively; and a hydraulic system, indicated generally at J, for controllably feeding hydraulic fluid under pressure to such hydraulic actuators. The valves of the hydraulic system J include solenoid actuators which are controlled from the switches MS1, LS1, LS2, and LS3. A manual control valve MV is provided for controlling the operation of hydraulic actuator H.

*Detailed Description*

A frame structure is provided, comprising generally, a pair of horizontal rails 21 extending between and supported by standards 22 and 23 at the forward and rearward ends of the machine respectively. The standard 22 is of yoke or arch form (FIG. 5) comprising vertical legs 24 secured at their lower ends to a horizontal base frame 25, and a pair of spaced overhead cross beams 26 the respective ends of which are secured to the upper ends of legs 24. The standard 23 comprises simply a pair of laterally spaced legs secured and braced to the base frame 25 by gussets 27, the upper ends of legs 23 being suitably secured to the rails 21. Gussets 28 are utilized to brace the forward legs 24. Base frame 25 includes a pair of lateral sill members and a pair of cross beams 29 at forward and rear ends thereof respectively.

The hopper A is of conventional construction, open at both top and bottom as indicated at FIG. 1. It is mounted to the rails 21 by brackets 33 which are secured to the outward sides of rails 21. Extending forwardly from the hopper A and secured to the respective rails 21 are a pair of laterally spaced guards 34 having respective horizontal flanges projecting inwardly over and beyond the upper sides of the rails 21.

Feed drawer unit B is of rectangular form as viewed in plan, having a width substantially less than the distance between the inward sides of the rails 21, and comprising respective side members 35 and a back member 36 disposed in respective longitudinal and transverse vertical planes, a downwardly and rearwardly curving front lip 37 having a cut-off edge 38 at its rearward extremity, and a back up plate 39 which is secured to the upper margin of back member 36 and projects rearwardly therefrom in the top plane of the feed drawer, the respective sides of backup plate 39 extending laterally beyond the side members 35 of the feed drawer, overlapping the upper faces of rails 21, and terminating in guard lips 40 which extend downwardly in lapping relation to the outer sides of rails 21. Extending transversely of the feed drawer B and journalled in bearings in the respective side members 35, are rotary vane type agitators 41, driven by an electric motor 43 mounted on a shelf 44 secured and projecting rearwardly from the lower margin of back member 36, a series of chain drives 45 being provided to carry the drive from the motor 43 to all of the agitators.

The feed drawer unit B further includes a pair of carriage slide bars 46 secured to the outer faces of the respective side members 35 in the upper area thereof between the rails 21, projecting rearwardly between rails 21, and having at their forward and rear ends respectively, rollers 47 and 48 which are in rolling engagement with the lower flanges 49 of the respective rail 21, in the spaces defined laterally between the slide arms 46 and the rails 21. Thus the drawer unit B is supported for reciprocating movement in a horizontal path, with the back up plate 39 just clearing the upper surfaces of rails 21, free of rubbing contact therewith.

It may now be noted that the feed drawer B is generally in the form of an open rectangular box, open at its upper and lower sides, with the upper side adapted to register and communicate with the open mouth of hopper A to receive mud therefrom. The open lower side of the drawer, in the loading position thereof, is closed by an apron 50 which is supported in a horizontal plane by hanger yokes 51 suspended from the rails 21. The forward margin of apron 50 terminates immediately adjacent the rearward margin of mold unit C, at the top thereof, when the unit C is in its charging position shown in full lines in FIG. 1. Thus, the bottom of the feed drawer is closed by apron 50 in its movement between hopper A and mold unit C but is opened as it passes over the mold unit C so that the mud therein is discharged into the mold unit C as hereinafter more fully described.

The mold unit C comprises a rectangular open frame mold box 55 consisting of four flat plates secured together at the corners thereof and constituting a supporting frame for any selected mold which is loosely supported ("floated") therein. Referring now to FIG. 2, a typical mold, shown in fragmentary details therein, may comprise a rectangular frame 56 somewhat smaller than the internal contour of mold box 55, and a series of cores 57 supported therein by bridge-bars 58 the ends of which are secured to the lower margins of the respective side members 56. Defined between the ends and sides of cores 57 and the side members of frame 56 are mold cavities 59 the bottoms of which are defined by a movable stripper plate 60 of openwork spider form corresponding to the planform of the openwork block that is to be molded. Plate 60 is supported upon legs 61 in the form of rods secured to its underside and adjustably mounted, by means of nuts 62 threaded onto their lower ends, upon a stripper frame 63 of angle iron structure. Frame 63 is slidably mounted at its four corners within angle iron guides 64 secured to and projecting downwardly from the respective corners of the mold frame 56 and having, at their lower ends, respective feet 65. Secured to the guides 64 at the respective ends of the mold frame are bridge bars 66 extending transversely beneath the respective cross members of the mold box 55 and adapted to engage the same to suspend the mold frame in the mold box 55 in the inverted position C' thereof (FIG. 1). Correspondingly, an angle iron rim 67 is secured to the respective side members of mold frame 56 at the face thereof which is uppermost in the charging position shown in FIGS. 1 and 2, and is engaged by the upper margin of mold box 55 as the latter commences its inversion movement (indicated by the arcuate arrow 68) thus transferring the support of mold frame 56 to the mold box 55. When the mold box is in the charging position, the mold frame 56 is supported by enaggement of the feet 65 of guides 64 against the upper surface of vibrator unit D, and is free of any contact with the mold box 55, so that the mold frame may be freely vibrated by the vibrator unit D without being hampered by any attachment to the rest of the machine.

Mold box 55 is secured at its lower leftward corner (FIG. 1) to a hinge shaft 69 for arcuate swinging movement from its charging position as indicated by arrow 68 to the stripping position C', and for return from the stripping position, as indicated by arrow 70, back to the charging position. Shaft 69 is journalled in bearings 71 which are mounted on the upper ends of laterally spaced posts 72 secured to and rising from the base frame 45. Bearings 71 are attached to brackets 73 which in turn are secured to the upper ends of posts 72. At the front side of the machine, near FIG. 1, limit switches LS1 and LS2 are mounted on respective ends of brackets 73.

A pallet 75 is placed upon the mold frame rim 67 after the mold has been filled, and functions to close the top of the mold while the mold is being inverted. During the inverting movement, the pallet 75 is secured to the rim 67 by the automatic latching mechanism shown by FIGS. 1, 3 and 4. Mounted to each of the side panels of mold box 55 are a pair of longitudinally spaced bearings 76, in which is journalled a latch mounting shaft 77. To the respective ends of each shaft 77 are secured a pair of latch hooks 78 adapted to engage over a respective side margin of pallet 75 as indicated in FIG. 3. A pair of latch-actuator coil springs 79, anchored under tension between fingers 80 and 81 secured respectively to the shaft 77 and the lower margin of a respective side panel of mold box 55, function to spring-load the shaft 77 for rotation in the direction to move the latch hooks 78 inwardly into securing engagement with the pallet 75 when the mold frame 56 is raised by the mold box 55 in the beginning of the inversion swing 68; and will continue to secure the pallet to the mold frame until it reaches the inverted stripping position C'. Secured to the center of the shaft 77 is a double-ended rocker arm 82 which, as the mold unit arrives at the inverted position C', engages at its outer end against an abutment yoke 83 secured to a respective frame leg 24 on the underside thereof. Such engagement will rotate the shaft 77 in the direction to swing the latch hooks 78 backwardly to release the pallet 75 from the mold frame.

In the inverted position, mold box 55 is supported by engagement of abutment lugs 85, secured to its respective sides, against the upper ends of support standards 86 rising from frame 25.

Upon return of the mold unit to the charging position, the inward ends of rocker arms 82 will engage against the upper ends of abutment staffs 84 rising from the respective sides of the base of vibrator unit D, and again the shafts 77 will be rotated to spread the latch hooks 78 so that a pallet 75 may be placed over the mold frame rim 67 upon completion of a mold-filling operation.

In the charging position, the mold mox 55 is supported by engagement of abutment lugs 85 against the upper ends of support standards 86a secured to and rising from the base frame 26. With mold box 55 thus supported, and with the mold frame 56 supported by engagement of its feet 65 against the top of vibrator unit D, the mold box 55 will be spaced between the mold rim 67 and the abutment cross bars 66, with the mold frame 56 thus in floating relation to the mold box 55 for free vibration as previously stated.

*Strike off unit I.*—Feed drawer B is provided with a strike-off blade 90 (FIG. 4) adapted to be raised and lowered and, when lowered, to scrape the upper face of the mold as defined by the upper surfaces of rim 67 and core members 57, removing excess concrete and leaving the molded green blocks with their upper surfaces flush with said upper mold face, so that a pallet 75 may be laid upon the upper mold face in contact with the upper surfaces of the green blocks 87 (FIG. 3). The strike-off blade 90 is hingedly mounted to the forward wall 37 of feed drawer B by means of arms 91 secured to the rear face of the strike-off blade and attached to the front drawer wall 37 by hinges 92. Secured to and projecting forwardly from the upper margin of front drawer wall 37 is an apron 93, extending full width of the feed drawer, and carrying, at its forward end, a bracket 94 which is secured thereto and projects upwardly. A coil spring 95, retained on aligned pilots projecting toward one another from the forward wall 37 and from the upper margin of strike-off plate 90 respectively yieldingly loads the blade 90 for downward movement. Vertical movement of the strike-off blade is controlled by a solenoid 96 mounted on bracket 94, the armature of solenoid 96 being pivotally connected to a link 97 extending downwardly and linked to the forward side of strike-off blade 90 by a pivot 98. The solenoid 96 is energized whenever the feed drawer B is in forward motion (from the hopper over to the position for loading the mold) thus raising the strike-off blade 90 out of engagement with the upper face of the mold; and throughout the return stroke of the feed drawer back to its receiving poistion beneath the hopper, the solenoid is de-energized, thus permitting the spring 95 to move the strike-off blade downwardly against the upper face of the mold to scrape all excess concrete rearwardly, engaging any mud projecting above the upper face of the mold, dropping it into any unfilled mold cavities, and discharging any residual excess mud over the rear end of the mold box.

As will be described more fully hereinafter, the energizing of the solenoid 96 is controlled jointly with the control of rearward movement of the feed drawer, either by means of a manual controller for feed drawer movement or by an automatic controller responsive directionally to the feed drawer movement (to close the solenoid circuit upon forward movement away from the hopper and to open the solenoid circuit upon return movement to the hopper).

Vibrator unit D comprises a heavy base 100 having considerable inertia, supported upon legs 101 secured to and rising from base frame 25 and strongly braced as indicated; and a vibrator bed 102 mounted resiliently to the base 100, in parallel relation thereto and spaced thereabove, by means of coil springs 103 and soft rubber mounts 104, the latter being secured to the base and to the vibrator bed so as to tie them together. Vibration is imparted to the bed 102 by an eccentrically weighted vibrator shaft 105 journalled in bearings projecting downwardly from respective sides of bed 102 and driven by an electric motor 106 through a belt drive 107, motor 106 being mounted on base frame 25 as indicated.

Bed 102 has a solid flat head 108 against which the feet 65 of mold frame 56 are adapted to solidly rest so as to receive vibration from the bed 102.

Stripper press unit E comprises a press head 110 extending transversely between the legs 24 of forward frame standard 22 and provided at its respective ends with slide shoes 111 coupled to and slidable vertically upon tracks 112 which are secured to the inward sides of the legs 24. Coupling may be obtained in any satisfactory manner, as, for example, by utilizing a V-section in the tracks 112 and corresponding V-grooves in the shoes 111. Shoes 111 are adjustably connected to the respective ends of press head 110 by brackets 113, in a manner providing for adjustment of the tolerances between the shoes 111 and the tracks 112. Adjustment is provided in the connections between the brackets 113 and the press head 110, by means of clamp bolts extending through slots in brackets 113 and in attachment ears 114 on the ends of press head 110, as indicated.

A hydraulic actuator 115 is suspended, upon a pivotal coupling 116, from the top of a supporting arc 117 secured to and rising from the top cross bar 26 of the frame standard 22. The piston rod of actuator 115 is pivotally connected, at 109, to the center of press head 110. Actuator 115 is a two-way actuator for power actuation of the press-head 110 both in raising and lowering movements. Press head 110 includes a plurality of press fingers 118 secured thereto and extending parallel to the longitudinal axis of the machine. The fingers 118 function to engage and apply pressure to the stripper frame 63 when the mold unit is in the ejection position C', thereby applying downward pressure through the movable mold bottom spider 60 to eject the green molded blocks from the mold unit.

Mounted upon the press head 110 is a vibrator 119 (e.g. an air type vibrator) actuated by air under pressure supplied thereto through a hose 120. Vibrator 119 is actuated at the time the press fingers 118 engage the movable mold frame 63 and vibration is transmitted through the frame 63 to the movable mold bottom 60 and thence to the mold frame 56 to facilitate the release of the green blocks from the mold.

Pallet table F comprises a carriage 125 in the form of a cross-head secured to the upper end of a piston rod 126 of a hydraulic actuator 127 which is mounted on the base frame 25, projecting upwardly. At the respective ends of carriage 125 are slide shoes 128 corresponding to the slide shoes 111 of the press head 110, shoes 128 being slidably coupled to the tracks 112. Carriage 125 also includes a plurality of laterally spaced, longitudinally extending support bars 129, adapted to support a pallet 75. Secured to the respective ends of carriage 125 and projecting upwardly alongside the upper parts of shoes 128 are a pair of pressure transmitting sleeves 130, internally threaded, and carrying respective adjustment heads 131 (in the form of screws threaded therein) for engagement by lugs 132 secured to and projecting inwardly from upper slide shoes 111. Actuator 127 functions to elevate the carriage 125 during the inverting movement of the mold unit in response to hydraulic pressure fluid pumped into it from the pressure supply unit J, which includes control means, described more completely hereinafter, for permitting a reverse flow through a sequence and unloading valve which provides yielding resistance to the downward movement of the carriage 125, sufficient to support it in contact with attachment ears 114 of press head 110, but insufficient to interfere with the operation of press unit E. Thus the downward movement of the pallet head F is controlled by the press head E and uniform registration between the press head and the pallet table is maintained throughout the downward movement. Adjustment 131 may be actuated to adjust the spacing between press fingers 118 and pallet support bars 129, uniformly at both ends of the pallet, to correspond to the depth of the mold unit between the planes of the bottom of the pallet engaged against its open lower face and the margins of movable mold frames 63 which are engaged by the press fingers 118.

Motor drive unit G comprises an electric motor 140 supported from base 25 on legs 141, driving through a belt drive 142 into a reduction gear unit 143 of a worm drive type, with an output shaft 144 extending transversely and driving through a slip-clutch 145 to a sprocket 146 which in turn drives through a chain 147 to a sprocket 148 on the mold box hinge shaft 69, for inverting the mold unit C and returning it to its charging position.

Hydraulic actuator H comprises a cylinder having a tail end pivoted at 149 to a bracket bridging between rails 21, and a piston rod 150 extending through its head end and linked to the rear end of feed drawer B.

Hydraulic system J comprises a tank 151 for hydraulic fluid; a hydraulic (e.g. single stage vane) pump 152 mounted on tank 151; an electric motor 153; a suitable support 154 for tank 151 and motor 153; a belt drive 155 driving pump 152 from motor 153; solenoid valves 156 and 157 mounted on tank 151; an inlet 158 through which pump 152 draws liquid from the bottom of tank 151; a pressure-regulating valve 159 connected to the outlet of pump 152; a delivery line 160 leading from outlet valve 159; and a pressure line 161 receiving pressure fluid from delivery line 160 through a spring-loaded check valve 162 and distributing it through respective branches thereof to the respective valves 156, 157. Valves 156, 157 are actuated by respective solenoid actuators 164, 165. A common return-flow line 166 leads from both valves 156, 157 back to the tank 151.

Manual valve MV is actuated through a lever 168, on which switch MS2 is mounted adjacent the handle thereof, so that the operator can pull the lever toward himself to start forward movement of feed drawer B, and simultaneously actuate switch MS2 to start the operation of vibrator D and agitators 41. Valve MV is supplied with pressure liquid through an inlet line 169 branching from pressure line 161. From two outlets of valve MV, tail and head pressure lines 170 and 171 lead to the tail and head ends of drawer actuator H, the outlet to line 170 being opened when the lever is pulled toward the operator (to move feed drawer B to mold-charging position) and the outlet to line 171 being opened when the lever is pushed back toward the machine (returning the drawer to its loading position beneath hopper A). When either of lines 170, 171 is pressurized, the other line will carry return flow from the actuator H back to valve MV, from which the fluid is returned to the tank 151 through a return line 172.

From the respective outlets of two-way valve 156, tail and head pressure lines 173, 174 lead to the tail (upper) and head (lower) ends respectively of the hydraulic actuator 115 of press E. Valve 156 is actuated in one direction by an electric circuit which is closed by switch LS1 when mold unit C reaches the end of its inverting movement. When thus actuated, valve 156 directs pressure through line 173 to the tail end of actuator 115, thus moving press head 110 downwardly. Switch LS1 also operates to stop motor G, thus arresting the inverting movement of mold unit C. Valve 156 is actuated in the other direction by switch LS3, which responds to downward movement of press E at the lower limit thereof. Such actuation directs pressure fluid through line 174 to the head end of actuator 115 to raise the press.

Valve 157 is actuated by pressing on push button switch MS1, which simultaneously closes the forward drive circuit of motor G to start inverting movement of the mold unit C. When valve 157 is thus actuated, pressure liquid is directed through a pressure line 175 (functioning both as a feed line and a return line) through a flow regulating needle valve 176 to the tail end of actuator 127 of pallet table F to raise the table F. Such elevating movement is arrested by limit switch LS5 at the proper height for the pallet table to receive and support the inverted mold unit C. This is accomplished by placing valve 157 in a neutral position for free flow of returning fluid into return line 156. A sequencing-unloading valve 177, disposed in fluid line 175, functions to pass the return flow through line 175 at a selected back pressure (for supporting the pallet table while yielding to the downward movement of press E) which back pressure can be regulated by adjustment of valve 177.

Motor G, when actuated in the forward direction, drives through drive mechanism 142-148 to slowly rotate shaft 69 in the inverting direction 68 until the motor is stopped by limit switch LS1 (opening its forward circuit). Motor G is energized for reverse movement, by actuation of switch LS4 in response to upward movement of press E. This starts the return movement of mold unit C, which is arrested by actuation of limit switch LS2, stopping motor G. It may be noted at this point that physical arrest of mold unit movement with accurate positioning thereof in the charging and ejection positions respectively, is effected by engagement of the mold box 55 against support standards 86 and 86a.

Control Circuits and Operation

Referring now to circuit diagram FIG. 9, the control circuits are energized by utilizing two sides of a 3-phase circuit comprising power lines P1 and P2 respectively (only the connections to line P1 being shown). The potential difference between the two sides, at 120° phase angle apart, provides the power for actuating the control circuits.

The vibrator and agitator units utilize a separate circuit comprising a relay R1 the energizing circuit of which is closed by actuation of push button switch MS2, and the output circuits 200, 201 of which lead respectively to the magnetic vibrator D and the agitator motor 43 respectively. It will be understood that magnetic starters may be interposed between the circuits 200, 201 respectively and the power circuits for the agitator and vibrator units, but such starters are conventional and are omitted to simplify the disclosure herein.

For the hydraulic system, a manual starting switch and power circuit (not shown in the diagram) are placed in operation when the machine is started, and operation thereof continues until the machine is shut down. As previously described, the hydraulic control lever 168 is actuated to start the movement of the feed drawer B (after it has been filled from the hopper A) toward the position for charging the mold, and normally the operator will manually control the drawer B through several traverses over the mold unit C, while observing the top of the mold, until the mold is satisfactorily filled, and will then return the feed drawer to its normal position beneath the hopper by manual control of the lever 168. During this operation, he will effect agitation in the feed drawer to promote maximum flow into the mold by actuating the push button MS2 while grasping lever 168. Simultaneously, the vibrator D will be energized to vibrate the mold and promote the compact filling of the mold. Also, when the hydraulic control lever 168 is actuated to move the feed drawer away from the hopper, the solenoid 96 will be automatically energized (under control through switch S6 which is mechanically actuated by lever 168) to lift the strike off blade 90 throughout the forward drawer movement away from the hopper; and conversely, when the hydraulic control lever is returned to its normal position, to start the return movement of the feed drawer B, the solenoid 96 is de-energized, activating its spring 95 to lower the strike-off blade against the top of the mold so as to effect a strike-off operation as it is drawn back toward the hopper and over the end of the mold.

When the mold has been satisfactorily filled, the operator manually operates push button MS1 to close the energizing circuit 202 of a relay R2, thereby closing, in said relay R2, a pair of contacts in a control circuit 204 leading to a magnetic starter switch (not shown) for the motor 140 of the mold inverting power unit G. Circuit 204 has a connection 205 to power line P2.

Relay R2 has second and third pairs of normally open contacts which, when closed, establish a holding circuit including a connection 206 to the energizing coil of relay R2, a connection 207 to a pair of normally closed contacts of limit switch LS1 and a branch power lead connection 208 from those contacts to power lead 205 through a normally closed push button switch MC1a associated with starting switch MS1. This holding circuit remains energized until limit switch LS1 is actuated by the arrival of the mold unit at its inverted position. Thereupon, the normally closed switch of LS1 is opened so as to break the circuit 207 to relay R2, thus de-energizing that relay and restoring it to its original open condition in which the circuit to the inversion power unit G is broken, thus arresting the inversion movement of the mold unit.

The solenoid 165 of hydraulic valve 157, for feeding the actuator 127 of pallet table unit F, is also energized by the closing of starting switch MS1. For this purpose, a branch circuit 211 leads from connection 202 to the energizing coil of relay R3 having a single set of normally open contacts in a circuit 212 leading to the valve solenoid 165 which, when energized, opens the valve 157 to feed hydraulic fluid to the pallet table actuator 127. Circuit 212 also includes a normally closed pair of contacts in limit switch LS5, which is connected through branch power line 208 and manual switch MS1a to power lead 205. The elevation of table unit F is thus arrested when it strikes the limit switch LS5 to open this circuit, thus placing valve 157 in the neutral position in which it will accommodate return flow as passed by the unloading valve 177.

Limit switch LS1, in addition to the aforesaid normally closed contacts, includes a pair of normally open contacts disposed in a circuit 213 leading to the energizing coil of a relay R4 which has a pair of normally open contacts in control circuit 214 leading to the solenoid 215 of double solenoid valve unit 156 which, when energized, directs pressure fluid into the hydraulic line 173 leading to the tail end of actuator 115 of press E, to start the downward movement of the press. Circuit 214 further includes a normally closed pair of contacts in limit switch LS3, connected to power through branch leads 208 and 205.

Relay R4 has a second pair of normally open contacts in a holding circuit 216 between power lead 208 and the energizing coil of relay R4. The closing of circuit 216 holds relay R4 closed (thus maintaining the circuit to solenoid 215 for continued feeding of hydraulic fluid for downward movement of the press) until the circuit is interrupted at the normally closed contacts of limit switch LS3, thus arresting the downward movement of the press.

Limit switch LS3 includes a pair of normally open contacts constituting part of an energizing circuit 217 for relay R5 which has three sets of normally open contacts 1, 2 and 3. Contacts 1 are part of a circuit 218 including a pair of contacts in limit switch LS4 and leading to solenoid 164 of double solenoid valve 156. Solenoid 164, when energized (by closing of contacts 1 of relay R5 upon actuation of limit switch LS3 at the lower limit of the stroke of press E) shifts valve 156 to the position for directing pressure fluid through hydraulic line 174 to the head (lower) end of press actuator 115, to immediately start return movement of the press, which is continued until the press has reached its limit of elevating movement, whereupon trip switch LS4 is actuated back to its normal position shown in the diagram, opening circuit 218 and arresting the flow of pressure fluid to the lower end of actuator 115.

Switch LS4 has a second set of contacts (normally closed) in a holding circuit which includes a pair of normally open contacts in limit switch LS2, a conductor 219, a second pair of normally closed contacts 2 in relay R5, a conductor 220 and the energizing coil of relay R5.

Relay LS2 has a single set of contacts, and an actuator lever (FIG. 1) positioned so as to be engaged by an eccentric pin 199 on the end of hinge shaft 69.

Relay R5 includes a third set of normally open contacts 3 in a circuit 221 for energizing a relay R6 which includes a set of normally open contacts in a self-holding circuit 222 and a second set of normally open contacts in a circuit 223 leading to the mold-return circuit of motor 140. Initially energized through circuit 221 through its connection 217 to branch power lead 208, relay R6 has its holding circuit 222 energized through connection 220 to branch conductor 208, which connection also supplies power to mold return circuit 223. Limit switch LS2 is closed when mold unit C is in its charging position, and functions to provide a starting circuit which is closed by the closing of starting switch MS1. When the mold box leaves its charging position, switch LS2 opens and remains open until mold unit C again returns to charging position. The opening of switch LS2 renders the other control switches LS1, LS3, LS4 etc. operative to control the remainder of the cycle of operation.

*Modified Features—FIGS. 7 and 8*

FIGS. 7 and 8 illustrate a number of modified features that can be embodied either separately or collectively in the apparatus.

Modified feature No. 1 involves the mounting of the mold unit C for swinging movements on an axis parallel to the major longitudinal axis of the machine, the inverting movements being indicated by arrows 68 and the return movements by arrows 70. Mounting trunnions 69a are consequently mounted in bearings 71a carried by supports 72a which are disposed in fore-aft alignment; and the fork lift L which removes the pallet 75 with its load of green blocks that have been ejected from the mold in its inverted position shown in FIG. 8, will be inserted from the rear side of the machine as indicated in FIG. 8, to engage the underside of pallet 75 just above the cross head 125 of pallet table unit F for removing the pallet load of green blocks from the rear side of the machine. In order to avoid interference with the fork lift, the cross head 125 is arranged to extend longitudinally of the machine, and its slide shoes 128 are slidably engaged with tracks 130 which are secured to the inner faces of bearing supports 72a. The press E, instead of being located at the extreme end of the machine, is mounted in a frame arch 181 which is secured to the frame rails 21 and extend therebelow just far enough to guide the slide shoes 111 of the cross head 110 of press E to the lower limit positions of downward press movement, leaving below the lower ends of arch 181 an unobstructed space for insertion and manipulation of the fork lift L. End standard 22a terminates at the height of rails 21. The mounting of press unit E in arch 181 is similar in construction to the mounting of the press unit E of FIG. 1, in front end standard 22 and corresponding reference numerals are therefore used to designate the same.

A second modified feature disclosed in FIGS. 7 and 8 is the positioning of the axis of inversion at the center of the mold unit C instead of at one end thereof. However, it is to be understood that the invention also contemplates the possibility of mounting the mold unit for transverse inverting movement on an axis parallel to the longitudinal axis of the machine as in FIGS. 7 and 8, but with such axis disposed at one side of the mold unit (as in FIG. 1) instead of at the center of the mold unit. Furthermore, the invention further contemplates the possibility of locating the axis of inverting movement midway between opposite extremities of the mold unit as in FIG. 8, but with the axis disposed transversely of the machine as in FIG. 1.

A third modified feature involves the mounting of vibrator unit D' directly to the press-out frame 63, and the arrangement of the press-out fingers 110a to straddle the vibrator D' in establishing contacting with the press-out frame 63.

The automatic latching mechanism of mold unit C may be varied to meet the requirements imposed by the tilting of the mold unit on a central axis. This may be accomplished by mounting the latch hooks 78a on pivots 77a carried by brackets attached to the respective ends of mold box 55 of the four corners thereof; and utilizing pairs of push rods 185 pivotally linked to the tail ends of latch hooks 78a, slidable in bearings 186 secured to the ends of mold box 55, spring loaded inwardly by coil springs 187 each acting between an outer bearing 186 and a collar 188 on a respective push rod, and the push rods having V-nosed inward ends normally engaged in V-shaped cam notches 189 in the opposite sides of bearings 71a, whereby, when the mold unit reaches a horizontal position (either in the charging position or the inverted ejection position) the inward ends of push rods 185 will drop into the cam notches of a bearing 71a in response to the loading of springs 187, thus drawing the tail ends of latch hooks 78 inwardly and spreading the hook ends thereof to release the pallet 75. Conversely, as the mold unit commences to rotate on trunnions 69a, the inward ends of push rods 185 will be cammed outwardly out of the cam notches of bearings 71a against the yielding resistance of springs 187, moving the hooks 78a inwardly to engage the pallet 75 against the mold frame rim 67.

Other features, indicated by corresponding reference numerals, are the same as in FIGS. 1–6. Hydraulic actuators, control plumbing switches and electric circuits are likewise as disclosed in FIGS. 1–6 and 9, and are located appropriately for operation by the same components of the machine as in the other form of the invention. To avoid unnecessary duplication of disclosure, these control and actuator components are not shown in FIGS. 7 and 8.

I claim:

1. Apparatus for molding screen-wall concrete blocks of relatively large face area and relatively small thickness, comprising, in combination: a frame; a feed drawer; means supporting said drawer for horizontal sliding movements between loading and mold-charging positions; a mold of relatively shallow depth having open and bottom sides of relatively large area and including a stripper providing a bottom for the mold during charging; means supporting said mold for oscillatory inversion and return movements on a horizontal axis adjacent one side of the mold, between a horizontal charging position below the mold charging position of said drawer, in which the said open side of the mold is upward for receiving from said drawer a charge of cement mud shaped by the mold into the form of a green block, and an inverted stripping position in which said open side is downward for discharge of the molded block, said stripping position being horizontally spaced from said charging position; a vibrator unit mounted on said frame in a fixed position below said charging position and engaged by said mold when in said charging position, for imparting vibration to said charge of cement as the mold is filled; latching means pivotally mounted on said mold along opposite sides thereof and operable to releasably attach to the mold, when filled with mud, a pallet covering said open side during inversion of the mold; means yieldingly biasing said latching means to close into holding engagement with opposite margins of said pallet as the mold moves away from its said charging position in an inversion movement; means carried by said frame in a position to be engaged by said pallet latching means as the mold approaches its said charging position during a return movement, operable to spread said latching means for reception of a pallet into closing position upon the mold; means carried by said frame in position to be engaged by said latching means as the mold approaches said stripping position, operable to spread said latching means so as to release said pallet from the mold; a stripper press disposed above said stripping position of the mold on a fixed vertical axis, said press being operable, by downward movement from above, to engage said stripper for ejecting the green block downwardly from the mold; and a pallet table disposed below said stripping position of the mold and having means supporting the same for downward movement in synchronized relation to the stripping of the green block, to provide support for the block during and after stripping.

2. Apparatus for molding screen-wall concrete blocks of relatively large face area and relatively small thickness, comprising, in combination: a frame; a feed drawer; means supporting said drawer for horizontal sliding movements between loading and mold-charging positions; a mold of relatively shallow depth having open and bottom sides of relatively large area and including a stripper providing a bottom for the mold during charging; means supporting said mold for oscillatory inversion and return movements on a horizontal axis adjacent one side of the mold, between a horizontal charging position below the mold charging position of said drawer, in which the said open side of the mold is upward for receiving from said drawer a charge of cement mud shaped by the mold into the form of a green block, and an inverted stripping position in which said open side is downward for discharge of the mold block, said stripping position being horizontally spaced from said charging position; a vibrator unit mounted on said frame in a fixed position below said charging position and engaged by said mold when in said charging position, for imparting vibration to said charge of cement as the mold is filled; holding means to releasably attach to the mold, when filled with mud, a pallet covering said open side during inversion of the mold; means operable at said stripping position of the mold, to actuate said stripper for stripping the green block downwardly from the mold; means automatically operable as the mold arrives at said charging position during a return movement, to condition said holding means for reception of a pallet into closing position upon the mold; means automatically operable as the mold arrives at said stripping position to actuate said holding means to release said pallet from the mold; and a pallet table disposed below said stripping position of the mold and having means supporting the same for downward movement in synchronized relation to the stripping of the green block, to provide support for the block during and after stripping.

3. A block molding machine as defined in claim 2, including reversible electric motor means for inverting the mold and returning it to its charging position; and electric circuit means for actuating said motor, including a limit switch carried by said frame in a position to be engaged by the mold as it arrives at the stripping position, for arresting operation of said motor means and thereby positioning the mold in the stripping position.

4. A block molding machine as defined in claim 2, including reversible electric motor means for inverting the mold and returning it to its charging position; and a limit switch carried by said frame in a position to be engaged by said mold as it arrives at the charging position, to arrest operation of said electric motor means and thereby to position the mold in said charging position.

5. Apparatus for molding screen-wall concrete blocks of relatively large face area and relatively small thickness, comprising, in combination: a frame; mold-charging means; a mold of relatively shallow depth having open and bottom faces of relatively large area and including a stripper providing a bottom for the mold during charging; means supporting said mold for oscillatory inversion and return movements on a horizontal axis adjacent a peripheral side of the mold, between a horizontal charging position in which the said open face of the fold is upward for receiving cement mud from said mold-charging means, and an inverted stripping position in which said open face is downward for discharge of the molded block, said stripping position being horizontally spaced from said charging position; vibrator means for imparting vibration to said charge of cement as the mold is filled; opposed latch means pivotally mounted on said mold along opposite sides thereof and operable to releasably attach to the mold, when filled with mud, a pallet covering said open side during inversion of the mold; means carried by said frame in a position to be engaged by said pallet latch means as the mold approaches its said charging position during a return movement, operable to spread said latch means for reception of a pallet into closing position upon the mold; means yieldingly biasing said latch means to close into holding engagement with opposite margins of said pallet as the mold moves away from its said charging position in an inversion movement; means carried by said frame in position to be engaged by said latch means as the mold approaches said stripping position, operable to spread said latch means so as to release said pallet from the mold; means operable at said stripping position to actuate said stripper for ejecting the green block downwardly from the mold; and a pallet table disposed below said stripping position of the mold and having means supporting the same for downward movement in synchronized relation to the stripping of the green block, to provide support for the pallet and block during and after stripping.

6. Molding apparatus as defined in claim 5, wherein said latch means comprises a pair of rocker shafts oscillatably mounted to respective peripheral sides of said mold at right angles to said axis of mold inversion movements, a plurality of latch hooks attached to each rocker shaft and projecting in a common direction past the plane of the open face of the mold, and a rocker arm secured to each rocker shaft and projecting transversely of the path of inversion movements of the mold; and wherein said latch-spreading means comprises an abutment fixed to the frame in the path of said rocker arm and engageable therewith as the mold approaches a respective one of its limit positions.

7. Molding apparatus as defined in claim 6, wherein said rocker arm has two end portions projecting in opposite directions from said rocker shaft, and wherein there are two of said abutments, located adjacent said charging and said discharge limit positions respectively, said abutments being engageable by respective ends of said rocker arm at respective limit positions of the mold.

8. Apparatus for molding concrete blocks, comprising, in combination: a frame; a feed drawer; means supporting said drawer for horizontal sliding movements between loading and mold-charging positions; a mold having open and bottom sides and including a stripper providing a bottom for the mold during charging; means supporting said mold for oscillatory inversion and return movements on a horizontal axis adjacent one side of the mold, between a horizontal charging position below the mold charging position of said drawer, in which the said open side of the mold is upward for receiving from said drawer a charge of cement mud shaped by the mold into the form of a green block, and an inverted stripping position in which said open side is downward for discharge of the molded block, said stripping position being horizontally spaced from said charging position; a vibrator unit mounted on said frame in a fixed position below said charging position and engaged by said mold when in said charging position for imparting vibration to said charge of cement as the mold is filled; holding means to releasably attach to the mold, when filled with mud, a pallet covering said open side during inversion of the mold; means operable at said stripping position of the mold, to actuate said stripper for stripping the green block downwardly from the mold; means automatically operable as the mold arrives at said charging position during a return movement, to condition said holding means for reception of a pallet into closing position upon the mold; means automatically operable as the mold arrives at said stripping position to actuate said holding means to release said pallet from the mold; and a pallet table disposed below said stripping position of the mold and having means supporting the same for downward movement in synchronized relation to the stripping of the green block, to provide support for the block during and after stripping.

9. A block molding machine as defined in claim 8, wherein said pallet table supporting means comprises means yielding in response to downward pressure against said pallet table incident to the stripping operation.

10. Apparatus for molding concrete blocks, comprising, in combination: a frame; mold-charging means; a mold having open and bottom faces and including a stripper providing a bottom for the mold during charging; means supporting said mold for oscillatory inversion and return movements on a horizontal axis adjacent a peripheral side of the mold, between a horizontal charging position in which the said open face of the mold is upward for receiving cement mud from said mold-charging means, and an inverted stripping position in which said open face is downward for discharge of the molded block, said stripping position being horizontally spaced from said charging position; vibrator means for imparting vibration to said charge of cement as the mold is filled; opposed latch means pivotally mounted on said mold along opposite sides thereof and operable to releasably attach to the mold, when filled with mud, a pallet covering said open side during inversion of the mold; means carried by said frame in a position to be engaged by said pallet latch means as the mold approaches its said charging position during a return movement, operable to spread said latch means for reception of a pallet into closing position upon the mold; means yieldingly biasing said latch means to close into holding engagement with opposite margins of said pallet as the mold moves away from its said charging position in an inversion movement; means carried by said frame in position to be engaged by said latch means as the mold approaches said stripping position, operable to spread said latch means so as to release said pallet from the mold; means operable at said stripping position to actuate said stripper for ejecting the green block downwardly from the mold; and a pallet table disposed below said stripping position of the mold and having means supporting the same for downward movement in synchronized relation to the stripping of the green block, to provide support for the pallet and block during and after stripping.

References Cited in the file of this patent

UNITED STATES PATENTS

| 1,493,732 | Camp | May 13, 1924 |
|---|---|---|
| 2,227,756 | Kirkham | Jan. 7, 1941 |
| 2,464,641 | Hearn | Mar. 15, 1949 |
| 2,652,613 | Warren | Sept. 22, 1953 |
| 2,686,950 | Zevely | Aug. 24, 1954 |
| 2,787,041 | Pettipiece | Apr. 2, 1957 |
| 2,842,827 | Nickelson | July 15, 1958 |
| 3,006,053 | Miller | Oct. 31, 1961 |
| 3,011,241 | Fry et al. | Dec. 5, 1961 |

FOREIGN PATENTS

| 588,856 | Great Britain | June 4, 1947 |